US006903343B2

(12) United States Patent
Amon et al.

(10) Patent No.: US 6,903,343 B2
(45) Date of Patent: Jun. 7, 2005

(54) LIGHTWEIGHT LASER DESIGNATOR RANGER FLIR OPTICS

(75) Inventors: Max Amon, Maitand, FL (US); Richard LeBlanc, Orlando, FL (US); James W. Hand, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 351 days.

(21) Appl. No.: 09/988,671

(22) Filed: Nov. 20, 2001

(65) Prior Publication Data

US 2005/0001168 A1 Jan. 6, 2005

(51) Int. Cl.[7] .............................. G01J 5/02; G01B 11/26
(52) U.S. Cl. ...................................... 250/353; 250/352
(58) Field of Search ............................... 250/353, 352, 250/342, 347, 349, 330, 332, 334; 356/72, 326, 365; 359/351, 353, 726

(56) References Cited

U.S. PATENT DOCUMENTS

| | | | |
|---|---|---|---|
| 4,155,096 A | 5/1979 | Thomas et al. | |
| 4,624,563 A | * 11/1986 | Johnson | ................... 356/141.3 |
| 4,626,100 A | * 12/1986 | Johnson | ................... 356/141.3 |
| 4,783,593 A | 11/1988 | Noble | |
| 4,989,962 A | 2/1991 | Kebo | |
| 5,005,083 A | 4/1991 | Grage et al. | |
| 5,049,740 A | 9/1991 | Pines et al. | |
| 5,136,421 A | 8/1992 | Sagan | |
| 5,258,618 A | 11/1993 | Noble | |
| 5,418,364 A | 5/1995 | Hale et al. | |
| 5,729,376 A | * 3/1998 | Hall et al. | ................... 359/366 |
| 5,831,762 A | 11/1998 | Baker et al. | |
| 5,900,620 A | 5/1999 | Livingston | |
| 5,903,005 A | 5/1999 | Smith | |
| 5,918,305 A | 6/1999 | Livingston | |
| 5,933,272 A | 8/1999 | Hall | |
| 5,936,771 A | 8/1999 | Cooper | |
| 5,939,706 A | 8/1999 | Livingston | |
| 6,021,975 A | 2/2000 | Livingston | |
| 6,088,165 A | * 7/2000 | Janeczko et al. | ........... 359/629 |
| 6,180,990 B1 | 1/2001 | Claiborne et al. | |
| 6,274,868 B1 | * 8/2001 | Hall et al. | .................. 250/332 |
| 6,359,681 B1 | 3/2002 | Housand et al. | |
| 6,410,897 B1 | 6/2002 | O'Neill | |
| 6,495,827 B2 | * 12/2002 | Metcalf et al. | ............. 250/330 |

OTHER PUBLICATIONS

Myers et al., U.S. Appl. No. 09/988,660, filed Nov. 20, 2001.

* cited by examiner

*Primary Examiner*—Constantine Hannaher
*Assistant Examiner*—Otilia Gabor
(74) *Attorney, Agent, or Firm*—Burns, Doane, Swecker & Mathis, L.L.P.

(57) ABSTRACT

A Midwave FLIR imaging optical apparatus has both a narrow and wide field of view. The imaging optical apparatus has a See Spot mode of operation, where a laser designator spot image is superimposed on the FLIR image in the narrow field of view. A laser rangefinder receiver path is also provided. A shared aperture collects incident radiation, which after manipulation by a plurality of optically significant surfaces, projects radiation to a detector. The imaging optical system is lightweight and compact and efficiently transmits FLIR energy and a narrow band of laser energy so that a signal due to a source outside the pass bands of interest (including solar energy) will not adversely effect operation of the imaging optical apparatus.

59 Claims, 5 Drawing Sheets

LIGHTWEIGHT LASER DESIGNATOR RANGER FLIR OPTICS

BACKGROUND

1. Field of Invention

The present device relates generally to optical apparatus for gathering imagery. More specifically, the device relates to a forward looking infrared (FLIR) apparatus having multiple optical systems.

2. Background Information

Forward looking infrared (FLIR) imaging systems are known. Such systems can be used with laser designators that illuminate the target with a laser beam to enhance tracking, such as noted in U.S. Pat. No. 4,155,096, the disclosure of which is hereby incorporated by reference in its entirety. Moreover, FLIR imaging systems can employ a laser and an associated detection scheme for illuminating and detecting a particular "hit spot" on a certain area of a target to enhance the likelihood of a target kill, such as noted in U.S. Pat. Nos. 5,900,620 and 5,918,305, the disclosures of which are hereby incorporated by reference in their entirety. Typically, FLIR imaging systems on military aircraft include optics to provide a wide field of view (WFOV) for piloting and optics to provide a narrow field of view (NFOV), for targeting, such as described in U.S. Pat. Nos. 5,418,364, 5,005,083, 5,049,740, 5,933,272, and 5,936,771, the disclosures of which are hereby incorporated by reference in their entirety.

Generally, the FLIR system and the laser designator are separate modules because FLIR optics typically will not transmit the wavelength of the laser designator or because the FLIR detector will not respond to the wavelength of the laser designator. In such systems, the FLIR system and the laser designator system must be boresighted to insure that the laser designator accurately illuminates the target. Boresighting is typically accomplished using an optical device (a boresight tool) that bridges the apertures of the FLIR system and laser designator system such that some of the emission from the laser designator is converted to thermal energy that can be imaged by the FLIR system for aligning the two systems.

However, the relative alignment (lines of sight) for FLIR and laser-designator systems designed as separate modules will typically change due to vibration, temperature changes, and other environmental conditions. Accordingly, repeated boresighting in such systems is necessary. Whether such boresighting is accomplished manually or automatically, such as described in U.S. Pat. No. 4,155,096 to Thomas et al., the boresighting tool adds to the complexity, weight, and cost of the overall FLIR/laser-designator system.

U.S. Pat. No. 5,900,620 discloses optics that both receive radiation from a target and receive a reflected laser beam incident on the target. The system described therein partially shares certain optical components along a partial common optical axis. However, the system therein also includes separate optical components disposed along different optical axes for changing polarization and for directing the target radiation and the reflected laser radiation to separate detectors. Accordingly, the system disclosed in U.S. Pat. No. 5,900,620 has the potential to suffer from the alignment problems requiring corrective boresighting similar to those noted above. Moreover, the system therein utilizes separate detectors for the above-noted functions, thereby having higher power requirements and additional complexity compared to a system utilizing a single detector for the above-noted functions.

SUMMARY

The present invention is directed to an imaging optical apparatus that combines FLIR and laser-designator optical systems. Exemplary embodiments minimize the number of components, including detectors, to reduce weight, system complexity, and cost. The present invention provides an imaging optical apparatus and a method for gathering optical imagery that achieves these and other goals.

In an exemplary embodiment, an imaging optical apparatus has a first detector, a first optical system with a first field of view for projecting at least a first portion of incident radiation emitted from a target onto the first detector, a second optical system having a second field of view narrower than the first field of view for projecting at least a second portion of the incident radiation onto the first detector, and a third optical system configured to receive radiation reflected from the target, the third optical system being operable with the second optical system to project the reflected radiation onto the first detector. The second and third optical systems share an entrance aperture and an optical axis and the first portion and the second portion of incident radiation have a coincident focal plane located at the first detector. A fold mirror located in the optical path of the first and second optical systems between the first and second aperture and the first detector selectively directs to the first detector the first portion of the incident radiation or the second portion of the incident radiation and the reflected radiation.

An additional exemplary embodiment further comprises a fourth optical system configured to receive radiation in a third wavelength range emitted by a ranging laser toward the target and reflected from the target. The fourth optical system shares the entrance aperture with the second and third optical systems.

A further exemplary embodiment further comprises a second detector, wherein the second detector only receives radiation from the fourth optical system.

The exemplary embodiment of the imaging optical apparatus is a catadioptric optical system, utilizing both refractive and reflective optically significant surfaces. Additionally, the second optical system is a narrow field of view (NFOV) optical system comprising at least one catadioptric optically significant surface with a narrowband filter.

In an exemplary method of gathering imagery from a target, radiation emitted from a target in a first wavelength range is received using a first optical system having a wide field of view (WFOV) that projects a WFOV image onto a first detector and a second optical system having a narrow field of view (NFOV) that projects a NFOV image onto the first detector. Radiation in a second wavelength range is received using a third optical system and projected as a first laser image onto the first detector. The radiation in the second wavelength range is emitted from a first laser toward the target and is reflected by the target. The second and third optical systems share an entrance aperture and the NFOV image and the first laser image can be simultaneously projected onto the first detector.

An additional exemplary method of gathering imagery further comprises receiving radiation in a third wavelength range using a fourth optical system. The third wavelength range is emitted from a second laser toward the target and is reflected by the target. The fourth optical system projects a second laser image onto a second detector.

In an exemplary method of constructing an imaging optical apparatus, a first detector, first optical system, second optical system, and third optical system are provided. The first optical system has a wide field of view (WFOV), is configured to receive radiation emitted from a target in a first wavelength range, and is selectable to project a WFOV image onto the first detector. The second optical system has a narrow field of view (NFOV), is configured to receive radiation emitted from the target in the first wavelength range, and is selectable to project a NFOV image onto the first detector. The third optical system is configured to receive radiation in a second wavelength range and is operable with the second optical system to project a first laser image onto the first detector. The second wavelength range is emitted by a first laser toward the target and reflected from the target. The second and third optical systems share an entrance aperture and the NFOV image and the designator image can be simultaneously projected onto the first detector.

An additional exemplary method of gathering imagery from a target further comprises receiving radiation in a third wavelength range using a fourth optical system. The third wavelength range is emitted from a second laser toward the target and is reflected by the target. The fourth optical system projects a second laser image onto a second detector.

BRIEF DESCRIPTION OF THE DRAWING FIGURES

Objects and advantages of the invention will become apparent from the following detailed description of preferred embodiments in connection with the accompanying drawings, in which like numerals designate like elements and in which.

DETAILED DESCRIPTION OF THE PREFERRED EMBODIMENTS

Figure 1:
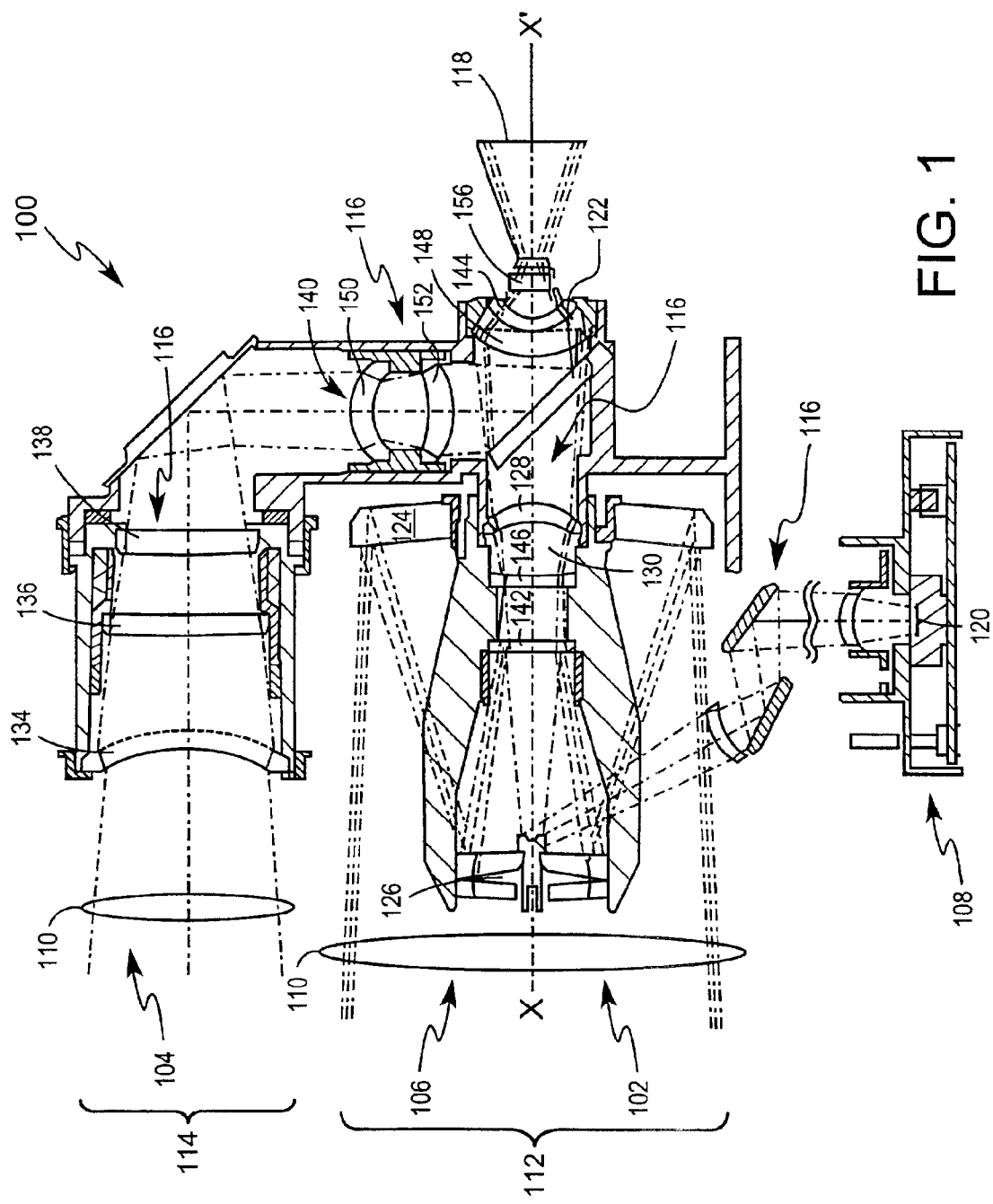
FIG. 1 is a schematic representation of the line trace of energy in a first embodiment of an imaging optical apparatus.

FIG. 1 is a schematic representation of the combined line trace of energy in a first embodiment of an imaging optical apparatus 100 with four assemblies. A NFOV FLIR optical assembly 102 and a WFOV FLIR optical assembly 104 image the thermal signature of an object. A See Spot optical assembly 106 superimposes a laser spot image on the NFOV FLIR image and can be used to select a hit point on an imaged object. "See Spot" is a term devised to describe an ability to image the laser spot on the same focal plane as the image (e.g., 3–5 $\mu$m image), and display both images simultaneously to the operator. A Range Finder optical assembly 108 collects laser energy and images the energy in a range receiver module.

In the imaging apparatus shown, incident energy 110 is collected at both a first aperture 112 and a second aperture 114, manipulated by a plurality of optically significant surfaces 116, and the images from three of the four assemblies are projected on one detector 118. As used herein, optically significant surface is any surface profile that transmits, reflects, or manipulates a desired wavelength of energy and shapes the wavefront of energy. Examples of optically significant surfaces include flat surfaces, spherical surfaces, aspherical surfaces, surface relief holographic gratings (kinoform), and coated or noncoated surfaces.

In the exemplary embodiment of FIG. 1, incident energy 110 is collected by the first aperture 112, is manipulated by a plurality of optically significant surfaces 116 in a narrow field of view (NFOV) optical assembly 102 and a See Spot optical assembly 106 to project at least a portion of the incident radiation 110 on a first detector 118. At least a portion of the incident energy 110 collected by the first aperture 112 is manipulated by a plurality of optically significant surfaces 116 in a Range Finder optical assembly 108 to project at least a portion of the incident radiation 110 on a second detector 118. Additionally, incident energy 110 collected by the second aperture 114 is manipulated by a plurality of optically significant surfaces 116 in a wide field of view (WFOV) optical assembly 104 to project at least a portion of the incident radiation 110 on the first detector 118.

In the exemplary embodiment shown in FIG. 1, three of the four assemblies share a common aperture. Specifically, the NFOV FLIR, See Spot, and Range Finder apertures have been combined into a first aperture 112. The WFOV FLIR assembly has a separate, second aperture 114. The WFOV FLIR field of view of the imaging optical apparatus 100 is selected by inserting a fold mirror 122 into the NFOV path.

Figure 2:
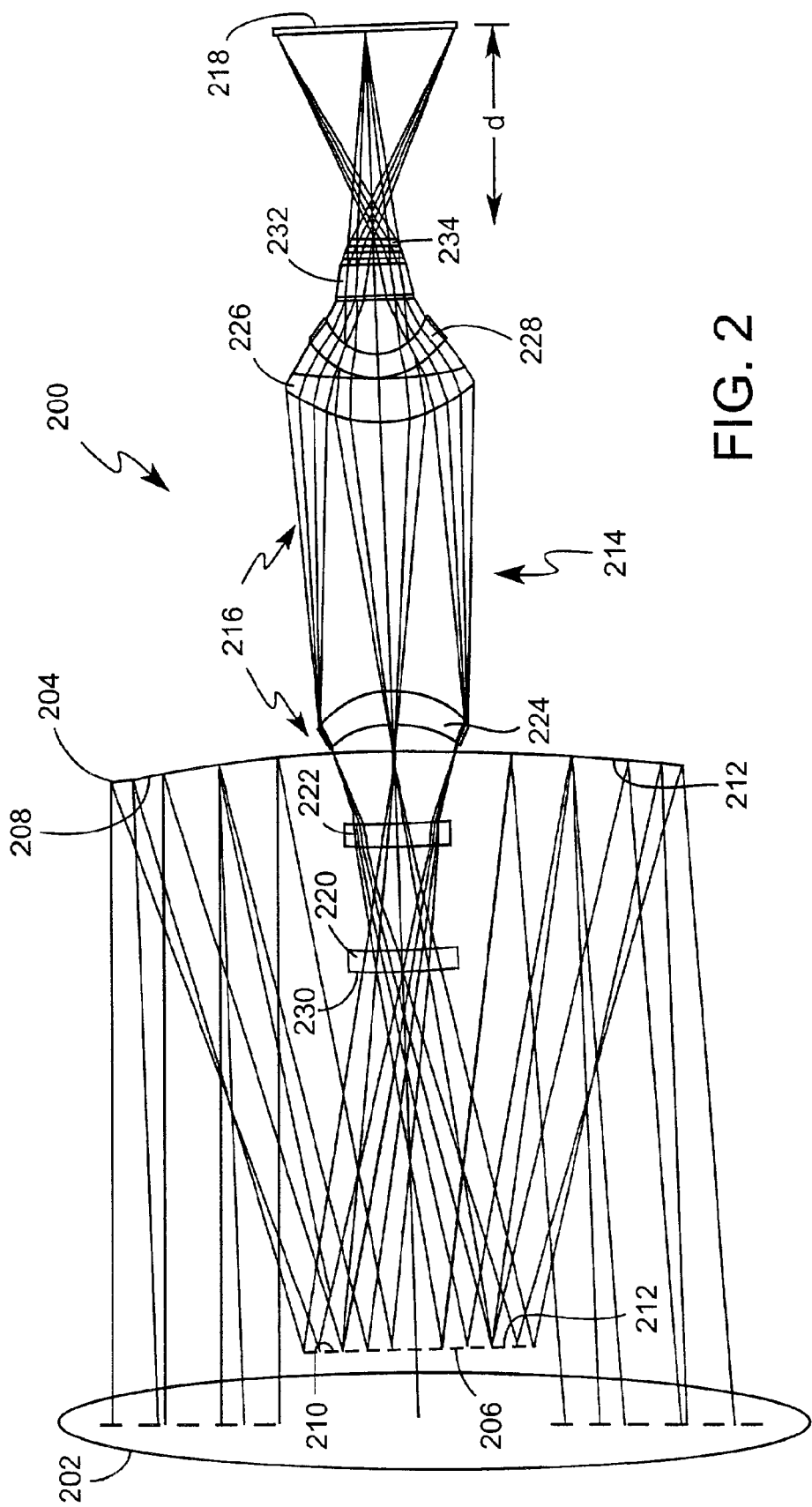
FIG. 2 is a schematic representation of the line trace of energy in an embodiment of a narrow field of view optical assembly.

FIG. 2 is an exemplary embodiment of a narrow field of view (NFOV) optical assembly 200 showing a schematic representation of the line trace of energy. Incident radiation 202 sequentially interacts with a primary mirror 204 followed by a secondary mirror 206. In the exemplary embodiment shown, the primary mirror 204 is an aspheric surface and the secondary mirror 206 is an aspheric surface. Incident thermal radiation is reflected off the first surface 208 of the primary mirror 204 and the first surface 210 of the secondary mirror 206 by a coating 212 that reflects the desired FLIR wavelengths. Additionally, the coating can transmit wavelengths that are not within the desired FLIR ranges.

Following the secondary mirror 206 in the optical path, incident radiation 202 enters the relay optical subassembly 214 and interacts with a series of optically significant surfaces 216 that manipulate the incident radiation and project the wavefront of energy on a first detector 218 at the focal distance. In the exemplary embodiment shown in FIG. 2, the relay optical subassembly 214 has a series of five optically significant surfaces. A first relay lens 220 and a second relay lens 222 sequentially receive incident radiation 202 from the secondary mirror 206 and transmit it through a first relay aspheric lens 224 and a second relay aspheric lens 226 followed by a relay exit lens 228. The first relay lens 220 is coated on the first surface 230, allowing desired FLIR and See Spot wavelengths to be transmitted. Incident radiation 202 passes through a warm filter 232 and a cold filter 234 and projects on the first detector 218 located at the focal distance. Both the warm filter 232 and the cold filter 234 assist in reducing noise in the system, the cold filter 234 from its location inside the cold space of the apparatus; the warm filter 232 from its location outside the cold space.

In operation, the NFOV assembly 200 forms an intermediate image from received incident FLIR energy that is then relayed by the relay optical subassembly 214 to the first detector 218. In the exemplary embodiment, the FLIR energy is 3.5–5 $\mu$m passively received from the thermal signature of an object within the field of view (FOV). The FLIR energy is sequentially reflected at the first surface 208 of the primary mirror 204 and the first surface 210 of the secondary mirror 206 to form the intermediate image. Obscuration caused by the secondary mirror 206 is minimized by placing the relay optical subassembly 214 to image the aperture stop on the secondary mirror 206.

In accordance with exemplary embodiments, an intermediate image of a high energy source anywhere within the system field of view will not damage any coatings or lens substrate.

Figure 3:
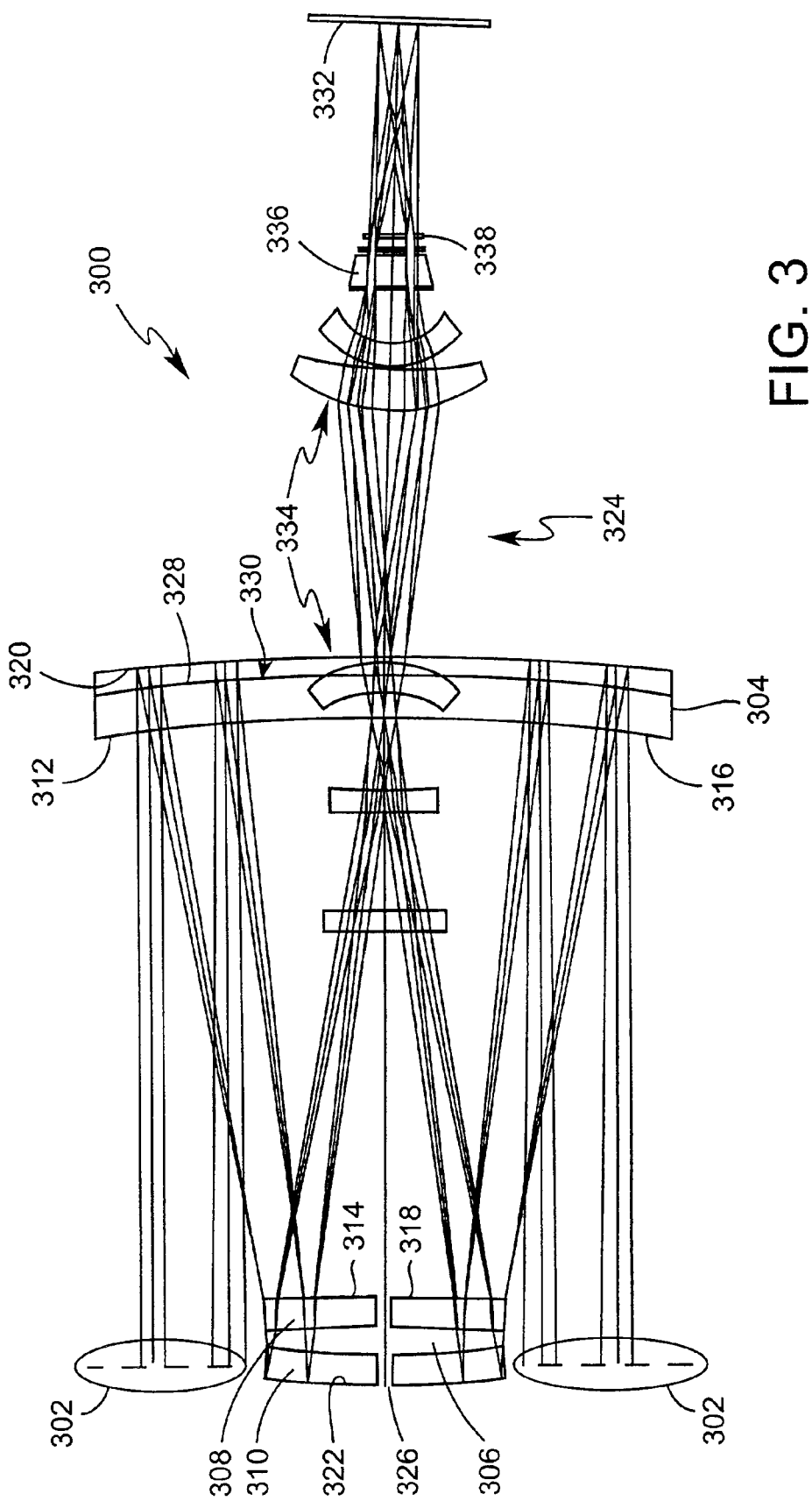
FIG. 3 is a schematic representation of the line trace of energy in an embodiment of a See Spot optical assembly.

FIG. 3 is an exemplary embodiment of a See Spot optical assembly 300 showing a schematic representation of the line trace of energy. Incident energy 302 enters through the first aperture of the imaging optical apparatus, is reflected and/or refracted depending on wavelength by the primary mirror 304 and is reflected and/or refracted depending on wavelength by the secondary mirror 306, which has two elements, a first element 308 and a second element 310.

In an exemplary embodiment, a single primary mirror with a rugate filter deposited on the rear surface can be used to reflect only the laser energy contained within the energy incident upon the primary mirror. Alternately, the primary mirror can be a split primary mirror. For example, the primary mirror can be split into two elements which are, for example, connected together (e.g., bonded with cement), with a narrow band coating being deposited on the interior or on the cemented surfaces, and a simple reflector deposited on the rear surface.

The split primary mirror 304 and the secondary mirror 306 of the exemplary embodiments are Mangin mirrors. Generally, Mangin mirrors allow energy of a desired wavelength ($\lambda$) to transmit through and reflect off a back surface of the optical element while blocking wavelengths other than the desired wavelength. In the exemplary embodiments shown, both the primary mirror 304 and the secondary mirror 306 have a coating 312, 314 on the respective first surfaces 316, 318 that reflect FLIR thermal energy and the Range Finder wavelength (i.e., in the examples shown, 3.5–5.1 $\mu$m and 1.58 $\mu$m, respectively) while allowing transmission of, among other wavelengths, the See Spot wavelength (i.e., in the examples shown, 1.064 $\mu$m). Transmitted See Spot wavelengths are transmitted by the coating 312, 314 and reflect at the second surface 320 of the primary mirror 304 and the second surface 322 of the second element 310 of the secondary mirror 306. For example, only the See Spot wavelength is reflected back through the two elements of the secondary mirror, creating an intermediate image that enters the relay optical subassembly 324. Here, a two element secondary mirror is used to match the focal lengths of the FLIR and See Spot optical assemblies so that the image size of each assembly is matched pixel by pixel, within the boresightable range, as the image moves off axis. The two elements 308, 310 of the secondary mirror 306 have an aperture 326 positioned substantially at the radial centerline.

Additionally, the primary mirror 304 is split into a cemented doublet with a narrow band filter 328 disposed at the cemented surface 330. The narrow band filter 328 is selected to the desired wavelength associated with the See Spot optical assembly and allows incident radiation transmitted by the coating 312 to be restricted to the laser wavelength. In the exemplary embodiments, the desired See Spot wavelength is 1.064 $\mu$m and the band pass filter is 15 nanometers in bandwidth. Additionally, the curve on the buried surface of the primary mirror 304 is selected so that any energy reflected from the buried surface will not reach the first detector 332. Radiation transmitted to the second surface 320 of the primary mirror 304 reflects off a silvered surface and passes a second time through the narrow band filter 328. This process results in a double filtering of the See Spot wavelength. In an alternative embodiment, a narrow band reflective coating (called a Rugate filter) can be used on the back surface of the Mangin primary mirror in place of the cemented surface.

The relay optical subassembly 324 is common to both the NFOV optical assembly and the See Spot optical assembly 300. After being transmitted by the five optically significant surfaces 334 of the relay optical subassembly 324, incident energy 302 is transmitted through a warm filter 336 and a cold filter 338 and is projected at the focal distance upon the first detector 332.

Figure 4:
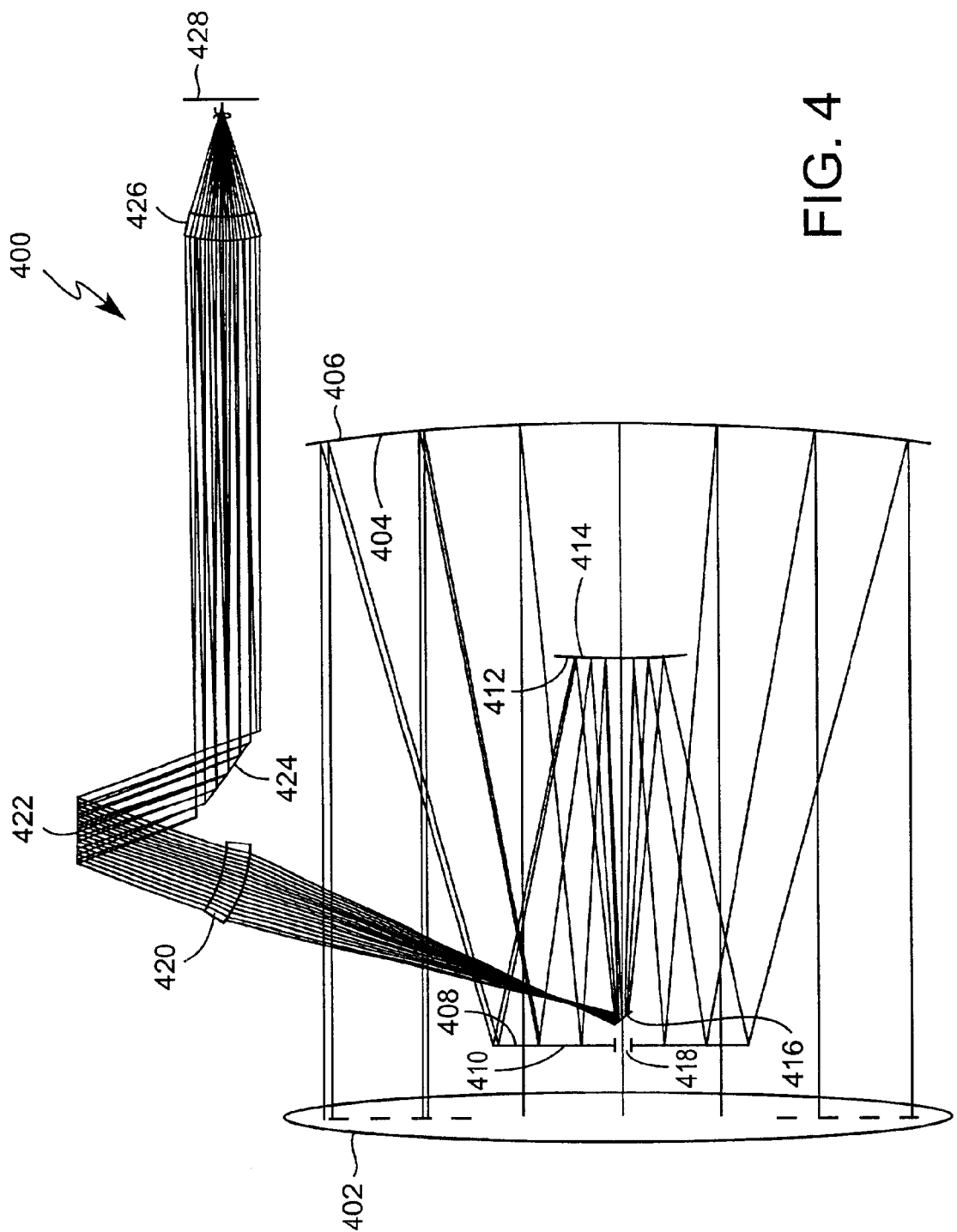
FIG. 4 is a schematic representation of the line trace of energy in an embodiment of a range finder optical assembly.

FIG. 4 is an exemplary embodiment of a range finder optical assembly 400 showing a schematic representation of the line trace of energy. Incident radiation 402 collected by the first aperture sequentially reflects off the first surface 404 of the primary mirror 406 and the first surface 408 of the secondary mirror 410 forming an intermediate image. The first surface 412 of the relay optical subassembly 414 is coated to reflect the desired range finder wavelength to be processed by the range finder optical assembly 400 while also transmitting the laser wavelength of the See Spot assembly and the FLIR wavelength of the NFOV assembly. The first surface 412 of the relay optical subassembly 414 acts like a tertiary mirror, reflecting the intermediate image to a mirror 416 located within the opening 418 in the radial center of the secondary mirror 410. The mirror 416 is a reflective surface that folds the optical path to the side where a lens 420 collimates the incident energy 402 and two fold mirrors 422, 424 sequentially fold the optical path to an imaging lens 426 and a second detector 428. In the exemplary embodiment shown in FIG. 4, the range finder optical assembly 400 manipulates incident radiation 402 in the 1.57 $\mu$m wavelength.

Figure 5:
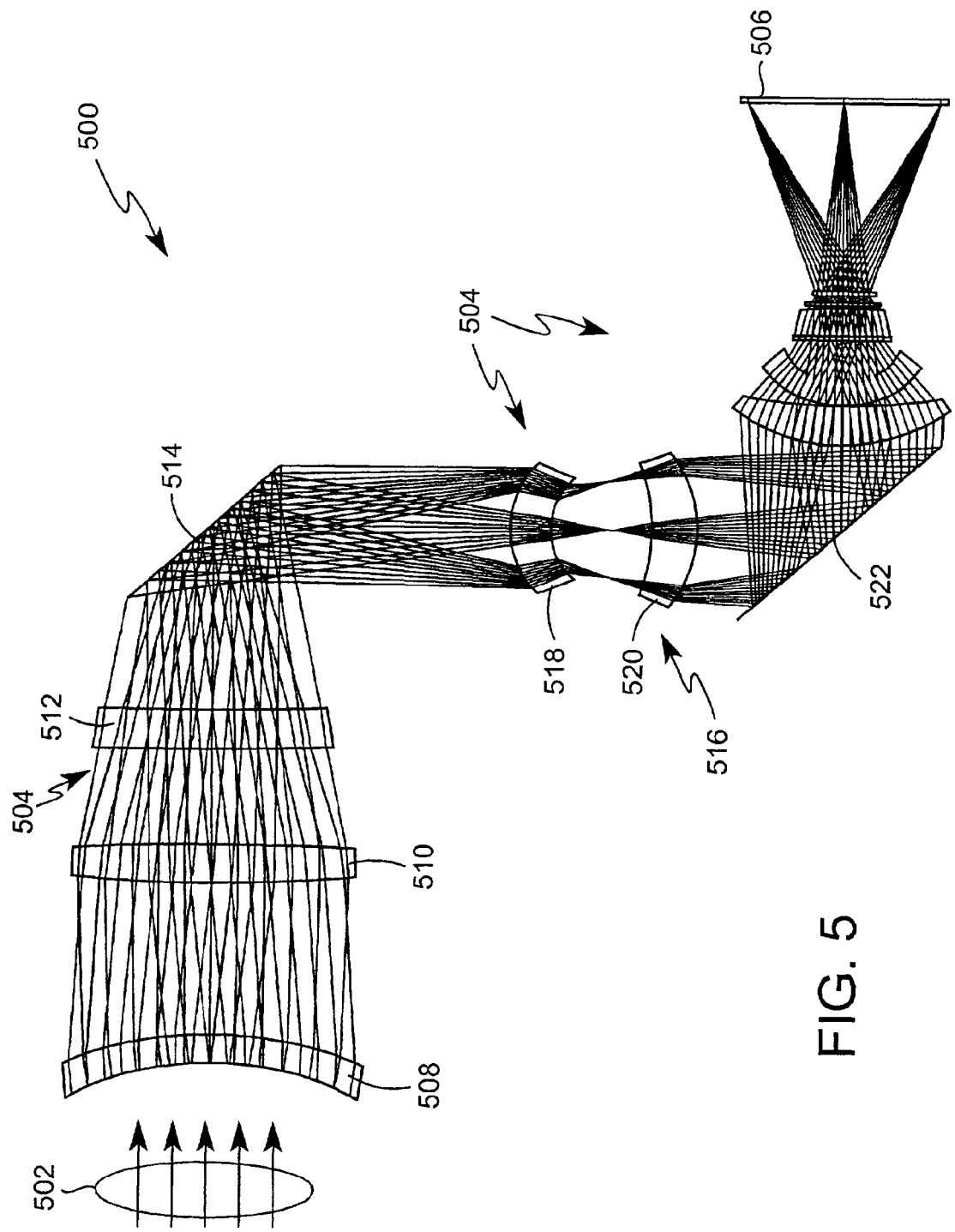
FIG. 5 is a schematic representation of the line trace of energy in an embodiment of a wide field of view optical assembly.

FIG. 5 is an exemplary embodiment of a wide field of view (WFOV) optical assembly 500 showing a schematic representation of the line trace of energy. Incident radiation 502 collected at a second aperture is manipulated by a series of optically significant surfaces 504 to project an image upon a first detector 506 at the focal plane. The first lens 508 receives the incident radiation 502 directly and transmits it to a second lens 510. The second lens 510 is an aspheric surface which transmits the energy to a third lens 512, followed sequentially by a fold mirror 514 and a WFOV relay optical subassembly 516.

The WFOV relay optical subassembly 516 shares at least a portion of the elements of the relay optical subassembly of the NFOV assembly. A first aspheric lens 518 and a second aspheric lens 520 manipulate incident radiation 502 to direct the incident radiation 502 and fold the incident radiation 502 into the relay optical subassembly by a fold mirror 522 positioned in the optical path of the relay optical subassembly prior to the seconds lens. The incident radiation 502 thereafter follows an optical path which is common to the FLIR NFOV and See Spot optical paths.

Table 1 presents the operating characteristics for the imaging optical apparatus of the exemplary embodiment of FIG. 1, including information for the four assemblies.

TABLE 1

General Operating Characteristics of the Four Optical Assemblies

|  | NFOV | WFOV | See Spot | Range Finder |
|---|---|---|---|---|
| Array Size (Pixels) | 640 × 480 | 640 × 480 | 164 Dia | Single |
| Pixel Size | 28μ | 28μ | 28μ | 0.2 mm |
| Array Size (mm × mm) | 17.92 × 13.44 | 17.92 × 13.44 | 0.28 × 0.28 | 0.2 × 0.2 |
| Focal Length (mm) | 269.2 | 117 | 269.2 | 150 |
| FOV (Degrees) | 3.8 × 2.8 | 8.8 × 6.5 | 1.0 Dia. | 0.1 |
| Operating Temp Range (° C.) | −37 to 49 | −37 to 49 | −37 to 49 | −37 to 49 |
| Aperture (Inches) | 2.58 | 0.9 | 2.2 | 2.6 |
| Obscuration (Area) | 0.30 | 0.0 | 0.42 | 0.18 |
| Transmission | 71% | 71% | 65% | 78% |
| Trans × (1-Obs loss) | 50% | 71% | 42% | 55% |
| Spectral Range (μm) | 3.5–5.1 | 3.6–5.1 | 1.064 | 1.54–1.58 |

The FLIR optics operate at the diffraction limit, meaning aberrations do not limit the optical performance, only the physical limitations of the apparatus limit the resolution. In the exemplary embodiment shown, the desired diffraction limited performance is achieved by utilizing four aspheric surfaces. Specifically, in the exemplary embodiment shown in FIG. 1, the four aspheric surfaces are the split primary mirror 124, the secondary mirror 126, the first NFOV relay lens 128 of the relay optical subassembly 130, and the second NFOV relay lens 132 of the relay optical subassembly 130.

An aspherical surface can be mathematically defined by:

$$H(x) = \frac{rx^2}{1+\sqrt{1-r^2(k+1)x^2}} + \sum a_i x^{(2+2i)} \text{ for } i = 1 \to n \quad \text{Eq. 1}$$

where r=radius of curvature, k=conic coefficient, and a, are aspheric coefficients.

There is a correspondence between the conic coefficient of Eq. 1 and the geometric surface profile. Table 2 illustrates this correspondence.

TABLE 2

Correspondence between k and the type of profile

| Value of k | Type of Profile |
|---|---|
| >0 | ellipse |
| =0 | sphere |
| −1 < k < 0 | ellipse |
| =−1 | parabola |
| <−1 | hyperbola |

In practice, one skilled in the art could utilize commercially available lens design software to obtain suitable values for the coefficients of Eq. 1, including the aspherical coefficients. An example of one such lens design software package is "CODE V©" available from Optical Research Associates of Pasadena, Calif. One skilled in the art could input information including, for example, image size, focal distance, and energy distribution across the detector and determine the optimized values for the coefficients of Equation 1.

The optical imaging apparatus can stay in focus over a significant operating temperature range without any action on the part of the operator. This is called passive athermalization. In an exemplary embodiment, passive athermalization for the four assemblies of the optical imaging apparatus occurs from about −37 to about +49° C., or the four assemblies can be configured to stay in focus over any desired operating range.

Passive athermalization can be accomplished by proper selection of the materials used for mounts and optical elements. For example, in the exemplary embodiment shown in FIG. 1, the split primary mirror 124 is calcium fluoride ($CaF_2$) and the secondary mirror 126 is arsenic trisulfide ($As_2S_3$). In the WFOV assembly 104, the first lens 134 is $CaF_2$, the first aspheric lens 136 is $As_2S_3$, and the second lens 138 is $CaF_2$.

It has been found that $CaF_2$ and $As_2S_3$ both have high coefficients of thermal expansion (CTE) and transmit the desired wavelength of energy for the FLIR system. In the exemplary embodiment shown, this wavelength is 1.064 μm. An additional advantage of $CaF_2$ and $As_2S_3$ is the ability to diamond turn precise optically significant surfaces. Finally, the $CaF_2$ and $As_2S_3$ materials are combined with aluminum (Al) housings to passively athermalize the NFOV, See Spot, and WFOV optical paths.

Material selection was also conducted for the optically significant surfaces of the relay optical subassembly 130 and the WFOV relay optical subassembly 140. In the relay optical subassembly 130, the first lens 142 and the relay exit lens 144 are $CaF_2$. The second lens 146, the first aspheric surface 128, and are the second aspheric surface 148 are zinc selenide (ZnSe). Both the second aspheric surface 148 and the relay exit lens 144 are common to both the relay optical subassembly 130 and the WFOV relay optical subassembly 140. Additional materials for the WFOV relay optical subassembly 140 are a first lens 150 made of silicon (Si) and an aspheric surface 152 of ZnSe. The warm filter 156 is a chalcogenide glass. Examples of chalcogenide glasses include arsenic selenide, arsenic selenide telluride, and "AMTIR-1," which is available from Amorphous Materials Inc. of Richardson, Tex.

The path of the incident radiation in at least a portion of the See Spot optical assembly is common with the NFOV optical assembly components. By selection of suitable materials, the desired first laser energy, for example, the laser energy of the See Spot assembly, is allowed to be transmitted through the primary and secondary mirrors creating a partially independent path for the desired laser energy. The partially independent path provides independent parameters that can be used to focus and boresight the first laser image, for example, the See Spot image, to the FLIR image.

The optical imaging apparatus collects, manipulates, and detects multiple wavelengths of interest. In the exemplary embodiment shown, the optical imaging apparatus has multiple wavelengths of interest, including 1.064 μm (designator wavelength), 1.57 μm (ranging wavelength), and 3.5–5.1 μm (NFOV and WFOV FLIR). The wavelengths or interest can be independently filtered to produce the desired bandwidth. For example, the 1.064 µm wavelength has a 15 nm FWHM (i.e., 1.064 µm±7.5 nm).

Referring to FIG. 1, the first detector 118 is positioned in alignment with the NFOV, See Spot and WFOV components of the optical imaging apparatus 100 about the axis X–X' at a focal length distance from the relay exit lens 144, at a coincident focal plane to at least two wavelengths manipulated and transmitted by the optical imaging apparatus 100. The elements of the relay optical subassembly 130 utilized by the WFOV FLIR assembly 104 are also located in alignment with the first detector 118 about the common axis X–X'. Examples of designs for optically significant surfaces that can manipulate at least two distinct wavelengths of energy are disclosed in commonly owned U.S. patent application Ser. No. 09/998,660 entitled "Multiband, Single Element Wide Field of View Infrared Imaging System", filed on even date herewith, the disclosure of which is incorporated herein by reference.

The first detector 118 can respond to and discriminate at least two, or any number of wavelengths of incident energy in the desired spectrum of interest, such as wavelengths at 1–6 µm. The first detector 118 processes the wavelengths to produce multiple waveband detection capability within a single detector. In one embodiment, the detector 118 concurrently collects radiation from multiple, adjacent spectral radiation bands. An example of such a detector is a detector used in "hyperspectral imaging" as disclosed in co-assigned U.S. Pat. No. 6,180,990 B1, issued to Claiborne et al., the disclosure of which is incorporated herein by reference. A second example of a detector suitable for use in the embodiment of FIG. 1 is an InSb detector. InSb defines the available resolution and pixel size of the system.

This invention has direct application to other wide field of view multiband uses, including but not limited to dual band navigation, advanced missile seekers and chemical agent detection.

In one aspect, an exemplary imaging optical apparatus 100 may have four optical assemblies (NFOV FLIR, WFOV FLIR, See Spot, and Range Finder) having the prescription contained in the following Tables 3 through 35, in which the surface identification correlates to the surfaces encountered by an incident radiation in the corresponding wavelength for each optical assembly as it travels from the respective aperture to the respective detector.

TABLE 3

NFOV FLIR

| Surface | Radius | Thickness | Medium | RN |
|---|---|---|---|---|
| 0 | 0.00000000 | 1.73600000e+20 | AIR | |
| 1 | 0.00000000 | 3.00000000 | AIR | |
| 2 | −9.32272495 | −2.70000000 | REFL | |
| 3 | −16.33751858 | 1.70000000 | REFL | |
| 4 | 3.50000000 | 0.10000000 | $CaF_2$ | 1.406725 |
| 5 | 12.41987651 | 0.46773010 | AIR | |
| 6 | 25.21782007 | 0.10000000 | ZnSe | 2.432024 |
| 7 | 2.48592402 | 0.45000000 | AIR | |
| 8 | −0.58824474 | 0.15000000 | ZnSe | 2.432024 |
| 9 | −0.51270916 | 1.20000000 | AIR | |
| 10 | 0.37587767 | 0.20000000 | ZnSe | 2.432024 |
| 11 | 2.79242889 | 0.01000000 | AIR | |
| 12 | 0.42040944 | 0.10000000 | $CaF_2$ | 1.406725 |
| 13 | 0.27000000 | 0.25000000 | AIR | |
| 14 | 0.00000000 | 0.02000000 | AMTIR 1 | 2.512965 |
| 15 | 0.00000000 | 0.14000000 | AMTIR 1 | 2.512965 |
| 16 | 0.00000000 | 0.02217000 | AIR | |
| 17 | 0.00000000 | 0.02000000 | Sapphire | 1.661534 |
| 18 | 0.00000000 | 0.03500000 | AIR | |
| 19 | 0.00000000 | 0.00000000 | AIR | |
| 20 | 0.00000000 | 0.02000000 | Sapphire | 1.661534 |
| 21 | 0.00000000 | 0.95000000 | AIR | |
| 22 | 0.00000000 | 0.03000000 | Silicon | 3.424290 |
| 23 | 0.00000000 | 1.75000000 | AIR | |
| 24 | 0.00000000 | −1.75000000 | AIR | |
| 25 | 0.00000000 | 0.00000000 | AIR | |

TABLE 4

Conic Coefficient And Aspheric Data For NFOV FLIR

| Surface | k | $a_4$ | $a_5$ | $a_6$ | $a_7$ |
|---|---|---|---|---|---|
| 2 | −1.71138E+00 | 1.27996E−04 | −9.16967E−05 | 5.24339E−05 | −9.17877E−06 |
| 3 | 0.00000E+00 | 5.06262E−03 | 5.02414E−03 | −1.96881E−02 | 3.01018E−02 |
| 9 | 0.00000E+00 | 3.83254E−02 | 1.67480E+00 | −2.90780E−01 | −2.55259E−02 |
| 11 | 0.00000E+00 | 2.59380E−01 | 6.80518E−02 | −6.75884E−01 | 1.36421E+00 |

TABLE 5

Refractive Indices for NFOV FLIR

| Surface | N1 | N2 | N3 | N4 | N5 | ABBE |
|---|---|---|---|---|---|---|
| 4 | 1.406725 | 1.413222 | 1.397784 | 1.000000 | 1.000000 | 26.346020 |
| 6 | 2.432024 | 2.434727 | 2.429151 | 1.000000 | 1.000000 | 256.826705 |
| 8 | 2.432024 | 2.434727 | 2.429151 | 1.000000 | 1.000000 | 256.826705 |
| 10 | 2.432024 | 2.434727 | 2.429151 | 1.000000 | 1.000000 | 256.826705 |
| 12 | 1.406725 | 1.413222 | 1.397784 | 1.000000 | 1.000000 | 26.346020 |
| 14 | 2.512965 | 2.515686 | 2.510511 | 1.000000 | 1.000000 | 292.360453 |
| 15 | 2.512965 | 2.515686 | 2.510511 | 1.000000 | 1.000000 | 292.360453 |

TABLE 5-continued

Refractive Indices for NFOV FLIR

| Surface | N1 | N2 | N3 | N4 | N5 | ABBE |
|---|---|---|---|---|---|---|
| 17 | 1.661534 | 1.691581 | 1.617929 | 1.000000 | 1.000000 | 8.981895 |
| 20 | 1.661534 | 1.691581 | 1.617929 | 1.000000 | 1.000000 | 8.981895 |
| 22 | 3.424290 | 3.427537 | 3.421964 | 1.000000 | 1.000000 | 435.001831 |

TABLE 6

Wavelength Number For NFOV FLIR

| WAVL NBR | 1 | 2 | 3 | 4 | 5 |
|---|---|---|---|---|---|
| Wavelength | 4.30000 | 3.60000 | 5.10000 | 0.0000 | 0.0000 |
| Spectral Wt | 1.0000 | 1.0000 | 1.0000 | 1.0000 | 1.0000 |

TABLE 7

Reference Object for NFOV FLIR

| REF OBJ HT | REF AP HT | OBJ SURF | REF SURF | IMG SURF |
|---|---|---|---|---|
| −0.742776E+19 | 0.12000 | 0 | 19 | 25 |
| (2.4500 DG) | | | | |

TABLE 8

Aperture Stop at Surf 19 of NFOV FLIR

| EFL | BF | F/NBR | Length | GIH |
|---|---|---|---|---|
| −10.4107 | −1.7500 | 4.03 | 8.0149 | −0.4529 |

TABLE 9

Standard And Boolean Aperture Data For NFOV FLIR

| Surface | Type | CAY | CAX | Y-Offset | X-Offset |
|---|---|---|---|---|---|
| 1 | CIR | 1.97167 | | 0.00000 | 0.00000 |
| 1 COBS | CIR | 0.60000 | | 0.00000 | 0.00000 |
| 2 | CIR | 1.40080 | | 0.00000 | 0.00000 |
| 3 | CIR | 0.57350 | | 0.00000 | 0.00000 |
| 4 | CIR | 0.27577 | | 0.00000 | 0.00000 |
| 5 | CIR | 0.27337 | | 0.00000 | 0.00000 |
| 6 | CIR | 0.26042 | | 0.00000 | 0.00000 |
| 7 | CIR | 0.25850 | | 0.00000 | 0.00000 |
| 8 | CIR | 0.32486 | | 0.00000 | 0.00000 |
| 9 | CIR | 0.37471 | | 0.00000 | 0.00000 |
| 10 | CIR | 0.46881 | | 0.00000 | 0.00000 |
| 11 | CIR | 0.43538 | | 0.00000 | 0.00000 |
| 12 | CIR | 0.33965 | | 0.00000 | 0.00000 |
| 13 | CIR | 0.25503 | | 0.00000 | 0.00000 |
| 14 | CIR | 0.20085 | | 0.00000 | 0.00000 |
| 15 | CIR | 0.19677 | | 0.00000 | 0.00000 |
| 16 | CIR | 0.16824 | | 0.00000 | 0.00000 |
| 17 | CIR | 0.15664 | | 0.00000 | 0.00000 |
| 18 | CIR | 0.15030 | | 0.00000 | 0.00000 |
| 19 | CIR | 0.12000 | | 0.00000 | 0.00000 |

TABLE 9-continued

Standard And Boolean Aperture Data For NFOV FLIR

| Surface | Type | CAY | CAX | Y-Offset | X-Offset |
|---|---|---|---|---|---|
| 20 | CIR | 0.13000 | | 0.00000 | 0.00000 |
| 21 | CIR | 0.13386 | | 0.00000 | 0.00000 |
| 22 | CIR | 0.44932 | | 0.00000 | 0.00000 |
| 23 | CIR | 0.45210 | | 0.00000 | 0.00000 |
| 24 | CIR | 1.46710 | | 0.00000 | 0.00000 |

TABLE 10

See Spot

| Surface | Radius | Thickness | Medium | RN |
|---|---|---|---|---|
| 0 | 0.00000000 | 1.73600000E+20 | AIR | |
| 1 | 0.00000000 | 3.00000000 | AIR | |
| 2 | −9.32272495 | 0.30000000 | CaF$_2$ | 1.428534 |
| 3 | −11.32355167 | −0.30000000 | REFL | |
| 4 | −9.32272495 | −2.70000000 | AIR | |
| 5 | −16.33751858 | −0.13000000 | As$_2$S$_3$ | 2.469290 |
| 6 | −8.74235769 | −0.13000000 | AIR | |
| 7 | 3.89857691 | −0.13000000 | As$_2$S$_3$ | 2.469290 |
| 8 | 5.52202743 | 0.13000000 | REFL | |
| 9 | 3.89857691 | 0.13000000 | AIR | |
| 10 | −8.74235769 | 0.13000000 | As$_2$S$_3$ | 2.469290 |
| 11 | −16.33751858 | 1.70000000 | AIR | |
| 12 | 3.50000000 | 0.10000000 | CaF$_2$ | 1.428534 |
| 13 | 12.41987651 | 0.46773010 | AIR | |
| 14 | 25.21782007 | 0.10000000 | ZnSe | 2.482134 |
| 15 | 2.48592402 | 0.45000000 | AIR | |
| 16 | −0.58824474 | 0.15000000 | ZnSe | 2.482134 |
| 17 | −0.51270916 | 1.20000000 | AIR | |
| 18 | 0.73587767 | 0.20000000 | ZnSe | 2.482134 |
| 19 | 2.79242889 | 0.01000000 | AIR | |
| 20 | 0.42040944 | 0.10000000 | CaF$_2$ | 1.428534 |
| 21 | 0.27000000 | 0.25000000 | AIR | |
| 22 | 0.00000000 | 0.02000000 | AMTIR 1 | 2.593302 |
| 23 | 0.00000000 | 0.14000000 | AMTIR 1 | 2.593302 |
| 24 | 0.00000000 | 0.02000000 | AIR | |
| 25 | 0.00000000 | 0.02000000 | Sapphire | 1.754553 |
| 26 | 0.00000000 | 0.03500000 | AIR | |
| 27 | 0.00000000 | 0.00000000 | AIR | |
| 28 | 0.00000000 | 0.02000000 | Sapphire | 1.754553 |
| 29 | 0.00000000 | 0.95000000 | AIR | |
| 30 | 0.00000000 | 0.03000000 | Silicon | 3.486409 |
| 31 | 0.00000000 | 1.75000000 | AIR | |
| 32 | 0.00000000 | −1.75000000 | AIR | |
| 33 | 0.00000000 | 0.00000000 | AIR | |

TABLE 11

Conic Coefficient and Aspheric Data for See Spot

| Surface | k | $a_4$ | $a_5$ | $a_6$ | $a_7$ |
|---|---|---|---|---|---|
| 2 | −1.71138E+00 | 1.27996E−04 | −9.16967E−05 | 5.24339E−05 | −9.17877E−06 |
| 4 | −1.71138E+00 | 1.27996E−04 | −9.16967E−05 | 5.24339E−05 | −9.17877E−06 |
| 5 | 0.00000E+00 | 5.06262E−03 | 5.02414E−03 | −1.96881E−02 | 3.01018E−02 |
| 8 | 0.00000E+00 | 5.18868E−03 | −2.53115E−03 | 2.13393E−03 | 5.46809E−03 |
| 11 | 0.00000E+00 | 5.06262E−03 | 5.02414E−03 | −1.96881E−02 | 3.01018E−02 |
| 17 | 0.00000E+00 | 3.83254E−02 | 1.67480E+00 | −2.90780E−01 | −2.55259E−02 |
| 19 | 0.00000E+00 | 2.59380E−01 | 6.80518E−02 | −6.75884E−01 | 1.36421E+00 |

TABLE 12

Refractive Indices for See Spot

| Surface | N1 | N2 | N3 | N4 | N5 | ABBE |
|---|---|---|---|---|---|---|
| 2 | 1.428534 | 1.000000 | 1.000000 | 1.000000 | 1.000000 | 0.428534 |
| 5 | 2.469290 | 1.000000 | 1.000000 | 1.000000 | 1.000000 | 1.469290 |
| 7 | 2.469290 | 1.000000 | 1.000000 | 1.000000 | 1.000000 | 1.469290 |
| 10 | 2.469290 | 1.000000 | 1.000000 | 1.000000 | 1.000000 | 1.469290 |
| 12 | 1.428534 | 1.000000 | 1.000000 | 1.000000 | 1.000000 | 0.428534 |
| 14 | 2.482134 | 1.000000 | 1.000000 | 1.000000 | 1.000000 | 1.482134 |
| 16 | 2.482134 | 1.000000 | 1.000000 | 1.000000 | 1.000000 | 1.482134 |
| 18 | 2.482134 | 1.000000 | 1.000000 | 1.000000 | 1.000000 | 1.482134 |
| 20 | 1.428534 | 1.000000 | 1.000000 | 1.000000 | 1.000000 | 0.428534 |
| 22 | 2.593302 | 1.000000 | 1.000000 | 1.000000 | 1.000000 | 1.593302 |
| 23 | 2.593302 | 1.000000 | 1.000000 | 1.000000 | 1.000000 | 1.593302 |
| 25 | 1.754553 | 1.000000 | 1.000000 | 1.000000 | 1.000000 | 0.754553 |
| 28 | 1.754553 | 1.000000 | 1.000000 | 1.000000 | 1.000000 | 0.754553 |
| 30 | 3.486409 | 1.000000 | 1.000000 | 1.000000 | 1.000000 | 2.486409 |

TABLE 13

Wavelength Number for See Spot

| WAVL NBR | 1 | 2 | 3 | 4 | 5 |
|---|---|---|---|---|---|
| Wavelength | 1.06400 | 0.00000 | 0.00000 | 0.00000 | 0.00000 |
| Spectral Wt | 1.0000 | 1.0000 | 1.0000 | 1.0000 | 1.0000 |

TABLE 14

Reference Object for See Spot

| REF OBJ HT | REF AP HT | OBJ SURF | REF SURF | IMG SURF |
|---|---|---|---|---|
| −0.151498E+19 (0.5000 DG) | 0.56998 | 0 | 5 | 33 |

TABLE 15

Aperture Stop at Surface 5 of See Spot

| EFL | EF | F/NBR | Length | GIH |
|---|---|---|---|---|
| −10.8617 | −1.7500 | 4.20 | 8.1027 | −0.0922 |

TABLE 16

Standard and Boolean Aperture Data for See Spot

| Surface | Type | CAY | CAX | Y-Offset | X-Offset |
|---|---|---|---|---|---|
| 1 | CIR | 1.97167 | | 0.00000 | 0.00000 |
| 1 COBS | CIR | 0.60000 | | 0.00000 | 0.00000 |
| 2 | CIR | 1.35325 | | 0.00000 | 0.00000 |
| 3 | CIR | 1.35325 | | 0.00000 | 0.00000 |

TABLE 16-continued

Standard and Boolean Aperture Data for See Spot

| Surface | Type | CAY | CAX | Y-Offset | X-Offset |
|---|---|---|---|---|---|
| 4 | CIR | 1.35325 | | 0.00000 | 0.00000 |
| 5 | CIR | 0.56998 | | 0.00000 | 0.00000 |
| 6 | CIR | 0.56822 | | 0.00000 | 0.00000 |
| 7 | CIR | 0.55973 | | 0.00000 | 0.00000 |

TABLE 16-continued

Standard and Boolean Aperture Data for See Spot

| Surface | Type | CAY | CAX | Y-Offset | X-Offset |
|---|---|---|---|---|---|
| 8 | CIR | 0.56514 | | 0.00000 | 0.00000 |
| 9 | CIR | 0.55973 | | 0.00000 | 0.00000 |
| 10 | CIR | 0.56822 | | 0.00000 | 0.00000 |
| 11 | CIR | 0.56998 | | 0.00000 | 0.00000 |
| 12 | CIR | 0.28593 | | 0.00000 | 0.00000 |
| 13 | CIR | 0.28149 | | 0.00000 | 0.00000 |
| 14 | CIR | 0.25408 | | 0.00000 | 0.00000 |
| 15 | CIR | 0.25064 | | 0.00000 | 0.00000 |
| 16 | CIR | 0.28793 | | 0.00000 | 0.00000 |
| 17 | CIR | 0.35777 | | 0.00000 | 0.00000 |
| 18 | CIR | 0.46162 | | 0.00000 | 0.00000 |
| 19 | CIR | 0.42779 | | 0.00000 | 0.00000 |
| 20 | CIR | 0.33370 | | 0.00000 | 0.00000 |
| 21 | CIR | 0.25053 | | 0.00000 | 0.00000 |
| 22 | CIR | 0.19825 | | 0.00000 | 0.00000 |
| 23 | CIR | 0.19431 | | 0.00000 | 0.00000 |
| 24 | CIR | 0.16671 | | 0.00000 | 0.00000 |
| 25 | CIR | 0.15558 | | 0.00000 | 0.00000 |
| 26 | CIR | 0.14947 | | 0.00000 | 0.00000 |
| 27 | CIR | 0.12000 | | 0.00000 | 0.00000 |
| 28 | CIR | 0.13000 | | 0.00000 | 0.00000 |
| 29 | CIR | 0.13359 | | 0.00000 | 0.00000 |
| 30 | CIR | 0.42617 | | 0.00000 | 0.00000 |
| 31 | CIR | 0.42878 | | 0.00000 | 0.00000 |
| 32 | CIR | 1.40208 | | 0.00000 | 0.00000 |

TABLE 17

Pickups for See Spot

| Surface | Type | J | A | B |
|---|---|---|---|---|
| 3 | TH | 2 | −1.0000 | 0.000000 |
| 3 | CLAP | 2 | 1.0000 | 0.000000 |
| 4 | PRO | 2 | | |
| 4 | CLAP | 2 | 1.0000 | 0.000000 |
| 8 | TH | 7 | −1.0000 | 0.000000 |
| 9 | CV | 7 | 1.0000 | 0.000000 |
| 9 | TH | 6 | −1.0000 | 0.000000 |
| 9 | CLAP | 7 | 1.0000 | 0.000000 |
| 9 | GLASS | 6 | | |
| 10 | CV | 6 | 1.0000 | 0.000000 |
| 10 | TH | 5 | −1.0000 | 0.000000 |
| 10 | CLAP | 6 | 1.0000 | 0.000000 |
| 10 | GLASS | 5 | | |
| 11 | PRO | 5 | | |
| 11 | CLAP | 5 | 1.0000 | 0.000000 |

TABLE 18

WFOV FLIR

| Surface | Radius | Thickness | Medium | RN |
|---|---|---|---|---|
| 0 | 0.00000000 | 1.73600000E+20 | AIR | |
| 1 | 0.00000000 | −3.07544775 | AIR | |
| 2 | −1.29093302 | 0.15000000 | CaF$_2$ | 1.406725 |
| 3 | −1.53198437 | 0.80000000 | AIR | |
| 4 | 6.25468909 | 0.20000000 | As$_2$S$_3$ | 2.409960 |
| 5 | −14.66270796 | 0.50183000 | AIR | |
| 6 | 11.12454416 | 0.20000000 | CaF$_2$ | 1.406725 |
| 7 | 13.00013306 | 0.97500000 | AIR | |
| 8 | 0.00000000 | 0.00000000 | REFL | |
| 9 | 0.00000000 | −1.32500000 | AIR | |
| 10 | −0.52179500 | −0.18000000 | Silicon | 3.424290 |
| 11 | −0.37991681 | −0.45000000 | AIR | |
| 12 | 1.04437275 | −0.20000000 | ZnSe | 2.432024 |
| 13 | 0.69368231 | −0.64500000 | AIR | |
| 14 | 0.00000000 | 0.00000000 | REFL | |
| 15 | 0.00000000 | 0.45500000 | AIR | |
| 16 | 0.73587767 | 0.20000000 | ZnSe | 2.432024 |
| 17 | 2.79242889 | 0.01000000 | AIR | |
| 18 | 0.42049440 | 0.10000000 | CaF$_2$ | 1.406725 |
| 19 | 0.27000000 | 0.25000000 | AIR | |
| 20 | 0.00000000 | 0.02000000 | AMTIR 1 | 2.512965 |
| 21 | 0.00000000 | 0.14000000 | AMTIR 1 | 2.512965 |
| 22 | 0.00000000 | 0.02000000 | AIR | |
| 23 | 0.00000000 | 0.02000000 | Sapphire | 1.661534 |
| 24 | 0.00000000 | 0.03500000 | AIR | |
| 25 | 0.00000000 | 0.00000000 | AIR | |
| 26 | 0.00000000 | 0.02000000 | Sapphire | 1.661534 |
| 27 | 0.00000000 | 0.95000000 | AIR | |
| 28 | 0.00000000 | 0.03000000 | Silicon | 3.424290 |
| 29 | 0.00000000 | 1.75000000 | AIR | |
| 30 | 0.00000000 | −1.75000000 | AIR | |
| 31 | 0.00000000 | 0.00000000 | AIR | |

TABLE 19

Conic Coefficient and Aspheric Data for WFOV FLIR

| Surface | k | $a_4$ | $a_5$ | $a_6$ | $a_7$ |
|---|---|---|---|---|---|
| 3 | 0.00000E+00 | 6.18164E−03 | −1.84263E−02 | 2.89468E−02 | −2.31931E−02 |
| 13 | 0.00000E+00 | −5.89448E−02 | −4.04862E−01 | −5.48331E−02 | −7.52782E−03 |
| 17 | 0.00000E+00 | 2.59380E−01 | 6.80518E−02 | −6.75884E−01 | 1.36421E+00 |

TABLE 20

Refractive Indices for WFOV FLIR

| Surface | N1 | N2 | N3 | N4 | N5 | ABBE |
|---|---|---|---|---|---|---|
| 2 | 1.406725 | 1.413222 | 1.397784 | 1.000000 | 1.000000 | 26.346020 |
| 4 | 2.409960 | 2.412932 | 2.406851 | 1.000000 | 1.000000 | 231.862040 |
| 6 | 1.406725 | 1.413222 | 1.397784 | 1.000000 | 1.000000 | 26.346020 |
| 10 | 3.424290 | 3.427537 | 3.421964 | 1.000000 | 1.000000 | 435.001831 |
| 12 | 2.432024 | 2.434727 | 2.429151 | 1.000000 | 1.000000 | 256.826705 |
| 16 | 2.432024 | 2.434727 | 2.429151 | 1.000000 | 1.000000 | 256.826705 |
| 18 | 1.406725 | 1.413222 | 1.397784 | 1.000000 | 1.000000 | 26.346020 |
| 20 | 2.512965 | 2.515686 | 2.510511 | 1.000000 | 1.000000 | 292.360453 |
| 21 | 2.512965 | 2.515686 | 2.510511 | 1.000000 | 1.000000 | 292.360453 |
| 23 | 1.661534 | 1.691581 | 1.617929 | 1.000000 | 1.000000 | 8.981895 |
| 26 | 1.661534 | 1.691581 | 1.617929 | 1.000000 | 1.000000 | 8.981895 |
| 28 | 3.424290 | 3.427537 | 3.421964 | 1.000000 | 1.000000 | 435.001831 |

TABLE 21

Wavelength Number for WFOV FLIR

| | WAVL NBR | | | | |
|---|---|---|---|---|---|
| | 1 | 2 | 3 | 4 | 5 |
| Wavelength | 4.30000 | 3.60000 | 5.10000 | 0.00000 | 0.00000 |
| Spectral Wt | 1.0000 | 1.0000 | 1.0000 | 1.0000 | 1.0000 |

TABLE 22

Reference Object for WFOV FLIR

| REF OBJ HT | REF AP HT | OBJ SURF | REF SURF | IMG SURF |
|---|---|---|---|---|
| −0.170216E+20 (5.6000 DG) | 0.12000 | 0 | 25 | 31 |

TABLE 23

Aperture Stop at Surface 25 Of WFOV FLIR

| EFL | BF | F/NBR | Length | GIH |
|---|---|---|---|---|
| −4.5398 | −1.7500 | −4.01 | 4.0268 | −0.4471 |

TABLE 24

Tilt and Dec Data for WFOV FLIR

| Surface | Type | YD | XD | Alpha | Beta | Gamma |
|---|---|---|---|---|---|---|
| 8 | TILT | 0.00000 | 0.00000 | 45.00000 | 0.00000 | 0.00000 |
| 9 | TILT | 0.00000 | 0.00000 | 45.00000 | 0.00000 | 0.00000 |
| 14 | TILT | 0.00000 | 0.00000 | −45.00000 | 0.00000 | 0.00000 |
| 15 | TILT | 0.00000 | 0.00000 | −45.00000 | 0.00000 | 0.00000 |

TABLE 25

Standard and Boolean Aperture Data for WFOV FLIR

| Surface | Type | CAY | CAX | Y-Offset | X-Offset |
|---|---|---|---|---|---|
| 2 | CIR | 0.65987 | | 0.00000 | 0.00000 |
| 3 | CIR | 0.67570 | | 0.00000 | 0.00000 |
| 4 | CIR | 0.63859 | | 0.00000 | 0.00000 |
| 5 | CIR | 0.63140 | | 0.00000 | 0.00000 |
| 6 | CIR | 0.54177 | | 0.00000 | 0.00000 |
| 7 | CIR | 0.51534 | | 0.00000 | 0.00000 |
| 8 | CIR | 0.57312 | | 0.00000 | 0.00000 |
| 9 | CIR | 0.34719 | | 0.00000 | 0.00000 |
| 10 | CIR | 0.34343 | | 0.00000 | 0.00000 |
| 11 | CIR | 0.26472 | | 0.00000 | 0.00000 |
| 12 | CIR | 0.35003 | | 0.00000 | 0.00000 |
| 13 | CIR | 0.40306 | | 0.00000 | 0.00000 |
| 14 | CIR | 0.65361 | | 0.00000 | 0.00000 |
| 15 | CIR | 0.45003 | | 0.00000 | 0.00000 |
| 16 | CIR | 0.48848 | | 0.00000 | 0.00000 |
| 17 | CIR | 0.45502 | | 0.00000 | 0.00000 |
| 18 | CIR | 0.35952 | | 0.00000 | 0.00000 |
| 19 | CIR | 0.27496 | | 0.00000 | 0.00000 |
| 20 | CIR | 0.22076 | | 0.00000 | 0.00000 |
| 21 | CIR | 0.21669 | | 0.00000 | 0.00000 |
| 22 | CIR | 0.18819 | | 0.00000 | 0.00000 |
| 23 | CIR | 0.17660 | | 0.00000 | 0.00000 |
| 24 | CIR | 0.17028 | | 0.00000 | 0.00000 |
| 25 | CIR | 0.12000 | | 0.00000 | 0.00000 |
| 26 | CIR | 0.15000 | | 0.00000 | 0.00000 |
| 27 | CIR | 0.15382 | | 0.00000 | 0.00000 |
| 28 | CIR | 0.46790 | | 0.00000 | 0.00000 |
| 29 | CIR | 0.47106 | | 0.00000 | 0.00000 |
| 30 | CIR | 1.48476 | | 0.00000 | 0.00000 |

TABLE 26

RANGE FINDER

| Surface | Radius | Thickness | Medium | RN |
|---|---|---|---|---|
| 0 | 0.00000000 | 1.73600000E+20 | AIR | |
| 1 | 0.00000000 | 3.00000000 | AIR | |
| 2 | −9.32272495 | −2.70000000 | REFL | |
| 3 | −16.33751858 | 1.70000000 | REFL | |
| 4 | 3.50000000 | −1.60000000 | REFL | |
| 5 | 0.00000000 | 0.00000000 | REFL | |
| 6 | 0.00000000 | 1.67730000 | AIR | |
| 7 | 0.70467935 | 0.10000000 | Silicon | 3.476107 |
| 8 | 0.80032921 | 0.40270000 | AIR | |
| 9 | 0.00000000 | 0.00000000 | REFL | |
| 10 | 0.00000000 | −0.75000000 | AIR | |
| 11 | 0.00000000 | 0.00000000 | REFL | |
| 12 | 0.00000000 | 2.25040000 | AIR | |
| 13 | 0.49354312 | 0.10000000 | Silicon | 3.476107 |
| 14 | 0.73069589 | 0.34843982 | AIR | |
| 15 | 0.00000000 | 0.20000000 | Sapphire | 1.745889 |

TABLE 26-continued

RANGE FINDER

| Surface | Radius | Thickness | Medium | RN |
|---|---|---|---|---|
| 16 | 0.00000000 | 0.04000000 | AIR | |
| 17 | 0.00000000 | 0.00000000 | AIR | |

TABLE 27

Conic Coefficient and Aspheric Data for RANGE FINDER

| Surface | k | $a_4$ | $a_5$ | $a_6$ | $a_7$ |
|---|---|---|---|---|---|
| 2 | -1.71138E+00 | 1.27996E-04 | -9.16967E-05 | 5.24339E-05 | -9.17877E-06 |
| 3 | 0.00000E+00 | 5.06262E-03 | 5.02414E-03 | -1.96881E-02 | 3.01018E-02 |

TABLE 28

Refractive Indices For RANGE FINDER

| Surface | N1 | N2 | N3 | N4 | N5 | ABBE |
|---|---|---|---|---|---|---|
| 7 | 3.476107 | 3.478568 | 3.475321 | 1.000000 | 1.000000 | 762.638556 |
| 13 | 3.476107 | 3.478568 | 3.475321 | 1.000000 | 1.000000 | 762.638556 |
| 15 | 1.745889 | 1.746414 | 1.745713 | 1.000000 | 1.000000 | 1.0651E+03 |

TABLE 29

Wavelength Number for RANGE FINDER

| | WAVL NBR | | | | |
|---|---|---|---|---|---|
| | 1 | 2 | 3 | 4 | 5 |
| Wavelength | 1.57000 | 1.54000 | 1.58000 | 0.00000 | 0.00000 |
| Spectral Wt | 1.0000 | 1.0000 | 1.0000 | 1.0000 | 1.0000 |

TABLE 30

Reference Object for RANGE FINDER

| REF OBJ HT | REF AP HT | OBJ SURF | REF SURF | IMG SURF |
|---|---|---|---|---|
| -0.173613E+18 (0.0573 DG) | -0.54348 | 0 | 3 | 17 |

TABLE 31

Aperture Stop at Surf 3 For RANGE FINDER

| EFL | BF | F/NBR | Length | GIH |
|---|---|---|---|---|
| -4.3385 | 0.0400 | 1.68 | 4.5488 | -0.0044 |

TABLE 32

Tilt and Dec Data for RANGE FINDER

| Surface | Type | YD | XD | Alpha | Beta | Gamma |
|---|---|---|---|---|---|---|
| 5 | TILT | 0.00000 | 0.00000 | 35.00000 | 0.00000 | 0.00000 |
| 6 | TILT | 0.00000 | 0.00000 | 35.00000 | 0.00000 | 0.00000 |
| 9 | TILT | 0.00000 | 0.00000 | 20.00000 | 0.00000 | 0.00000 |
| 10 | TILT | 0.00000 | 0.00000 | 20.00000 | 0.00000 | 0.00000 |
| 11 | TILT | 0.00000 | 0.00000 | -55.00000 | 0.00000 | 0.00000 |
| 12 | TILT | 0.00000 | 0.00000 | -55.00000 | 0.00000 | 0.00000 |

TABLE 32

Standard and Boolean Aperture Data for RANGE FINDER

| Surface | Type | CAY | CAX | Y-Offset | X-Offset |
|---|---|---|---|---|---|
| 1 | CIR | 1.97167 | | 0.00000 | 0.00000 |
| 1 COBS | CIR | 0.60000 | | 0.00000 | 0.00000 |
| 2 | CIR | 1.35325 | | 0.00000 | 0.00000 |
| 4 | CIR | 0.28593 | | 0.00000 | 0.00000 |
| 7 | CIR | 0.17633 | | 0.00000 | 0.00000 |
| 8 | CIR | 0.16377 | | 0.00000 | 0.00000 |
| 13 | CIR | 0.16493 | | 0.00000 | 0.00000 |
| 14 | CIR | 0.14391 | | 0.00000 | 0.00000 |
| 15 | CIR | 0.02889 | | 0.00000 | 0.00000 |
| 16 | CIR | 0.02579 | | 0.00000 | 0.00000 |

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. An imaging optical apparatus, comprising:
a first detector;
a first optical system with a first entrance aperture and having a first field of view for projecting at least a first portion of a first wavelength range on the first detector;
a second optical system having a second field of view narrower than the first field of view for projecting at least a second portion of the first wavelength range on the first detector; and
a third optical system configured to receive radiation in a second wavelength range, the third optical system being operable with the second optical system to project the radiation in the second wavelength onto the first detector,
wherein the second and third optical systems share a second entrance aperture and wherein the first portion and the second portion of the first wavelength range have a coincident focal plane located at the first detector.

2. The imaging optical apparatus of claim 1, wherein the first wavelength range is wavelengths emitted from a target.

3. The imaging optical apparatus of claim 1, wherein the second wavelength range is wavelengths emitted from a first laser and reflected from an object.

4. The imaging optical apparatus of claim 1, further comprising:
a fourth optical system configured to receive radiation in a third wavelength range emitted by a second laser toward the target and reflected from the target, the fourth optical system sharing the entrance aperture with the second and third optical systems.

5. The imaging optical apparatus of claim 4, further comprising:
a second detector, wherein the second detector only receives radiation from the fourth optical system.

6. The imaging optical apparatus of claim 4, wherein the fourth optical system is a laser ranger.

7. The imaging optical apparatus of claim 1, further comprising a fold mirror disposed in an optical path between the first entrance aperture and the second entrance aperture and the detector selectively directs to the first detector the first portion of the first wavelength range or the second portion of the first wavelength range and the radiation in the second wavelength range.

8. The imaging optical apparatus of claim 1, wherein the second portion of the incident radiation is at least partially included within the first portion of incident radiation.

9. The imaging optical apparatus of claim 1, wherein the third optical system is configured to receive radiation in a second wavelength range emitted by a designator laser toward the target and reflected from the target, the third optical system being selectable to project a designator image onto the detector.

10. The imaging optical apparatus of claim 1, wherein the imaging optical apparatus is a catadioptric optical system.

11. The imaging optical apparatus of claim 1, wherein the narrow field of view (NFOV) optical system comprises at least one catadioptnc optically significant surface with a narrowband filter.

12. The imaging optical apparatus of claim 1, wherein the second optical system and the third optical system share an optical axis.

13. The imaging optical apparatus of claim 1, wherein the detector is a single focal plane array.

14. The imaging optical apparatus of claim 1, wherein the detector is a hyperspectral detector.

15. The imaging optical apparatus of claim 1, wherein at least one optically significant surface is a split Mangin mirror with a cemented doublet and a narrowband filter, the optically significant surface having a coating disposed on a first surface that reflects at least a first desired wavelength and transmits a second desired wavelength.

16. The imaging optical apparatus of claim 15, wherein the second desired wavelength is reflected at a second surface.

17. The imaging optical apparatus of claim 15, wherein the second desired wavelength is filtered twice by a single narrowband filter.

18. The imaging optical apparatus of claim 1, wherein at least one optically significant surface is a Mangin mirror comprising a first element and a second element, the first element having a coating disposed on a first surface that reflects at least a first desired wavelength and transmits a second desired wavelength.

19. The imaging optical apparatus of claim 18, wherein the second element has a second surface that reflects only the second desired wavelength.

20. The imaging optical apparatus of claim 18, wherein the coating is a narrowband filter.

21. The imaging optical apparatus of claim 18, wherein the coating is a rugate coating and the first surface is a backside surface of the first element.

22. The imaging optical apparatus of claim 1, wherein the first optical system and the second optical system are a forward looking infrared radar and the third optical system is a laser designator.

23. The imaging optical apparatus of claim 1, wherein at least one optically significant surface is a combination of a lens and a Mangin mirror.

24. The imaging optical apparatus of claim 23, wherein the lens and the Mangin mirror are separated by an air space.

25. The imaging optical apparatus of claim 24, comprising a mirror located within an opening in the radial center of the combination of the lens and the Mangin mirror.

26. The imaging optical apparatus of claim 1, wherein the imaging optical apparatus is passively athermalized.

27. An imaging optical apparatus, comprising:
a first optical system having a first field of view for projecting at least a first portion of incident radiation emitted from a target to a first focal plane;
a second optical system having a second field of view narrower than the first field of view for projecting at least a second portion of the incident radiation to a second focal plane; and
a third optical system configured to receive radiation reflected from the target, the third optical system being selectable to project the reflected radiation to the second focal plane,
wherein the second and third optical systems share an entrance aperture and wherein the first focal plane and the second focal plane are coincident,
wherein the second and third optical systems include a common primary mirror and wherein the common primary mirror is a Mangin mirror with a narrowband coating, and wherein the primary mirror is a split mirror with a first portion and a second portion and the narrowband coating is at an interface of the first portion and the second portion.

28. The imaging optical apparatus of claim 27, further comprising:
a fourth optical system configured to receive radiation in a third wavelength range emitted by a ranging laser toward the target and reflected from the target, the fourth optical system sharing the entrance aperture with the second and third optical systems.

29. The imaging optical apparatus of claim 28, wherein the fourth optical system is a laser ranger.

30. The imaging optical apparatus of claim 27, wherein the second portion is at least partially included within the first portion.

31. The imaging optical apparatus of claim 27, wherein the third optical system is configured to receive radiation in a second wavelength range emitted by a designator laser toward the target and reflected from the target, the third optical system being selectable to project a designator image onto the detector.

32. The imaging optical apparatus of claim 27, wherein the first optical system and the second optical system are a forward looking infrared radar and the third optical system is a laser designator.

33. The imaging optical apparatus of claim 27, wherein the split mirror is a cemented doublet with a narrowband filter at a cemented surface.

34. The imaging optical apparatus of claim 27, wherein the narrowband coating is a rugate coating.

35. The imaging optical apparatus of claim 27, wherein the second and third optical systems include at least one optically significant surface, the optically significant surface having a combination of a lens and a Mangin mirror.

36. The imaging optical apparatus of claim 35, wherein the lens and the Mangin mirror are separated by an air space.

37. The imaging optical apparatus of claim 35, comprising a mirror located within an opening in the radial center of the combination of the lens and the Mangin mirror.

38. The imaging optical apparatus of claim 27, wherein the imaging optical apparatus is passively athermalized.

39. A method of gathering imagery from a target, comprising the steps of:
receiving radiation emitted from a target in a first wavelength range using a first optical system having a wide field of view (WFOV), the first optical system projecting a WFOV image onto a first detector;
receiving radiation emitted from the target in the first wavelength range using a second optical system having a narrow field of view (NFOV), the second optical system projecting a NFOV image onto the first detector; and
receiving radiation in a second wavelength range using a third optical system, said radiation in the second wavelength range being emitted from a first designator laser toward the target and being reflected by the target, the third optical system projecting a designator image onto the first detector,
wherein the second and third optical systems share an entrance aperture and wherein the NFOV image and the designator image can be simultaneously projected onto the first detector,
wherein the second and third optical systems include a common primary mirror and wherein the common primary mirror is a Mangin mirror with a narrowband coating, and
wherein the primary mirror is a split mirror with a first portion and a second portion and the narrowband coating is at an interface of the first portion and the second portion.

40. The method of claim 39, comprising a step of:
switching between the narrow field of view and the wide field of view.

41. The method of gathering imagery from a target of claim 39, further comprising the step of:
receiving radiation in a third wavelength range using a fourth optical system, said radiation in the third wavelength range being emitted from a second designator laser toward the target and being reflected by the target, the fourth optical system projecting a designator image onto a second detector.

42. The method of gathering imagery from a target of claim 41, wherein the fourth optical system is a laser ranger.

43. The method of claim 39, wherein the first optical system and the second optical system are a forward looking infrared radar and the third optical system is a laser designator.

44. The imaging optical apparatus of claim 39, wherein the split mirror is a cemented doublet with a narrowband filter at a cemented surface.

45. The imaging optical apparatus of claim 39, wherein the narrowband coating is a rugate coating.

46. The imaging optical apparatus of claim 39, wherein the second and third optical systems include at least one optically significant surface, the optically significant surface having a combination of a lens and a Mangin mirror.

47. The imaging optical apparatus of claim 46, wherein the lens and the Mangin mirror are separated by an air space.

48. The imaging optical apparatus of claim 46, comprising a mirror located within an opening in the radial center of the combination of the lens and the Mangin mirror.

49. The imaging optical apparatus of claim 39, wherein the imaging optical apparatus is passively athermalized.

50. A method of constructing an imaging optical apparatus, comprising the steps of:
providing a first detector;
providing a first optical system having a wide field of view (WFOV) and being configured to receive radiation emitted from a target in a first wavelength range, the first optical system being selectable to project a WFOV image onto the first detector;
providing a second optical system having a narrow field of view (NFOV) and being configured to receive radiation emitted from the target in the first wavelength range, the second optical system being selectable to project a NFOV image onto the first detector; and
providing a third optical system configured to receive radiation in a second wavelength range emitted by a first designator laser toward the target and reflected from the target, the third optical system being selectable to project a designator image onto the first detector,
wherein the second and third optical systems share an entrance aperture and wherein the NFOV image and the designator image can be simultaneously projected onto the first detector,
wherein the second and third optical systems include a common primary mirror and wherein the common primary mirror is a Mangin mirror with a narrowband coating, and
wherein the primary mirror is a split mirror with a first portion and a second portion and the narrowband coating is at an interface of the first portion and the second portion.

51. The method of constructing an imaging optical apparatus of claim 50, further comprising the step of:
receiving radiation in a third wavelength range using a fourth optical system, said radiation in the third wavelength range being emitted from a second designator laser toward the target and being reflected by the target, the fourth optical system projecting a designator image onto a second detector.

52. The method of constructing an imaging optical apparatus of claim 51, wherein the fourth optical system is a laser ranger.

53. The method of constructing an imaging optical apparatus of claim 50, wherein the first optical system and the second optical system are a forward looking infrared radar and the third optical system is a laser designator.

54. The imaging optical apparatus of claim 50, wherein the split mirror is a cemented doublet with a narrowband filter at a cemented surface.

55. The method of constructing an imaging optical apparatus of claim 50, wherein the narrowband coating is a rugate coating.

56. The method of constructing an imaging optical apparatus of claim 50, wherein the second and third optical systems include at least one optically significant surface, the optically significant surface having a combination of a lens and a Mangin mirror.

57. The method of constructing an imaging optical apparatus of claim 56, wherein the lens and the Mangin mirror are separated by an air space.

58. The method of constructing an imaging optical apparatus of claim 56, comprising a mirror located within an opening in the radial center of the combination of the lens and the Mangin mirror.

59. The method of constructing an imaging optical apparatus of claim 50, wherein the imaging optical apparatus is passively athermalized.

* * * * *

UNITED STATES PATENT AND TRADEMARK OFFICE
CERTIFICATE OF CORRECTION

PATENT NO. : 6,903,343 B2
DATED : June 7, 2005
INVENTOR(S) : Max Amon et al.

It is certified that error appears in the above-identified patent and that said Letters Patent is hereby corrected as shown below:

Column 21,
Line 66, "catadioptnc" should read -- catadioptric --.

Signed and Sealed this

Sixth Day of September, 2005

JON W. DUDAS
*Director of the United States Patent and Trademark Office*